3,371,094
N-(AMIDOXIMINO-LOWER-ALKYL)- AND N-AMIDINO - N - [(1 - PIPERIDYL) - LOWER-ALKYL]AMINES

Bernard L. Zenitz, Colonie, and Alexander R. Surrey, Albany, N.Y., assignors to Sterling Drug Inc., New York, N.Y., a corporation of Delaware
No Drawing. Continuation-in-part of application Ser. No. 432,845, Feb. 15, 1965. This application Nov. 25, 1966, Ser. No. 596,781
7 Claims. (Cl. 260—293)

ABSTRACT OF THE DISCLOSURE

N - (amidoximino - lower - alkyl) - and N-amidino-N-(and N,N - bis) [(1 - piperidyl) - lower-alkyl]amines, for example β-{N,N-bis-[3-(4-cyclohexylmethyl-1-piperidyl)-propyl]amino}propionamidoxime, having chemotherapeutic and pharmacodynamic, particularly anti-inflammatory, hypotensive, anti-fungal, and anthelmintic, activities, the amidoximino compounds being prepared by reaction of the corresponding N-(cyano-lower-alkyl)-N-(and N,N - bis-) [(1 - piperidyl) - lower-alkyl]amines with hydroxylamine, and the amidino compounds being prepared by reaction of the N- (and N,N-bis-) [(1-piperidyl)-lower-alkyl]amines with a 2-lower-alkyl-2-thiopseudourea.

---

This application is a continuation-in-part of our prior copending application Serial No. 432,845, filed February 15, 1965, now U.S. Pat. 3,325,500 (patented June 13, 1967) which in turn is a continuation-in-part of our prior application S.N. 129,995, filed August 8, 1961, and now abandoned.

This invention relates to N-(amidoximino-lower-alkyl)- and N - amidino - N - [(1-piperidyl)-lower-alkyl]amines, their acid-addition salts, and to processes for the preparation thereof.

Said amines have utility as chemotherapeutic and pharmacodynamic agents of a nature to be more fully described hereinafter.

The compounds of the instant invention are represented by the formula:

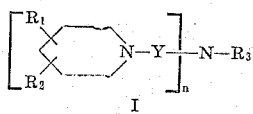

I wherein $R_1$ is lower-alkyl, unsubstituted-carbamyl, N-lower-alkylcarbamyl, N,N-di-lower-alkylcarbamyl, piperidinocarbonyl, pyrrolidinocarbonyl, hydroxy, lower-alkoxy, phenoxy, naphthoxy, phenyl - lower - alkoxy, naphthyl - lower - alkoxy, hydroxy - lower - alkyl, lower-akoxy - lower - alkyl, phenoxy - lower - alkyl, naphthoxy-lower - alkyl, lower - alkanoylamino, phenyl-lower-alkyl, cycloalkyl-lower-alkyl, or the group

where $R_4$ is phenyl, naphthyl, pyridyl, 3- or 4-piperidyl substituted on the nitrogen atom by lower-alkyl, lower-alkanoyl, phenyl-lower-alkyl, or benzoyl; $R_5$ is lower-alkyl, lower-alkanoyl, phenyl-lower-alkyl, benzoyl, carbamyl, N-lower-alkylcarbamyl, or N,N-di-lower-alkylcarbamyl; or $R_4$ and $R_5$ taken together with the nitrogen atom to which they are attached form a heterocyclic ring, for example, isoindolinyl, pyrrolidyl, piperidyl, or piperazinyl substituted on the 4-nitrogen atom by lower-alkyl, lower-alkanoyl, phenyl, phenyl-lower-alkyl, or benzoyl; $R_2$ is hydrogen or from one to five lower-alkyl radicals; $R_3$ is amidino or amidoximino-lower-alkyl; Y is lower-alkylene containing from two to eight carbon atoms and interposing at least two carbon atoms between the amino nitrogen atom of the (1-piperidyl)-lower-alkyl-amino group and the ring nitrogen atom of the piperidine nucleus; and $n$ is the integers 1 or 2.

In the above general Formula I, $R_2$ stands for hydrogen or from one to five lower-alkyl radicals. When $R_2$ is one or more lower-alkyl radicals, each lower-alkyl radical can be straight or branched and can occupy any of the five available positions or the piperidine ring, and when $R_2$ is more than one lower-alkyl radical, said radicals can be the same or different and can occupy the same or different positions on the piperidine ring.

As used herein, the terms lower-alkyl, lower-alkoxy, or lower-alkanoyl mean such groups containing from one to ten carbon atoms which can be either straight or branched and thus represent, inter alia, methyl, ethyl, n-propyl, isopropyl, n-butyl, n-hexyl, methoxy, ethoxy, propoxy, isopropoxy, butoxy, hexyloxy, formyl, acetyl, propionyl, isobutyryl, caproyl, decanoyl, and the like.

As used herein, the term cycloalkyl means cycloalkyl containing from three to seven carbon atoms, and thus represents, inter alia, cyclopropyl, cyclobutyl, cyclopentyl, cyclohexyl, or cycloheptyl.

In the above general Formula I, when $R_1$ represents a substituent bearing a phenyl (or benzyl) or naphthyl radical, the benzene or naphthalene rings thereof can be unsubstituted or can bear one or more substituents of low molecular weight and of such nature that they do not interfere with or take part in the reactions, to be described hereinafter, used in the preparation of the compounds. Examples of such substituents include halogen, lower-alkyl, lower-alkoxy, lower-alkyl-mercapto, lower-alkylsulfinyl, lower - alkyl - sulfonyl, trifluoro methyl, methylenedioxy, ethylenedioxy, carbo-lower-alkoxy, 2-phenylethoxy, benzyl, lower-alkanoyl, sulfamyl, amino, lower-alkanoylamino, lower-alkoxycarbonylamino, lower-alkanoyloxy, hydroxy, and the like. It will be understood that compounds bearing such substituents are the full equivalents of the unsubstituted compounds and are within the purview of the invention.

In the above general Formula I, Y is lower-alkylene containing from two to eight carbon atoms and interposing at least two carbon atoms between the amino nitrogen atom of the (1-piperidyl)-lower-alkylamino group and the ring nitrogen atom of the piperidine nucleus. The lower-alkylene group can be straight or branched and thus stands, inter alia, for 1,2-ethylene [—$CH_2CH_2$—], 1,3-propylene [—$(CH_2)_3$—],

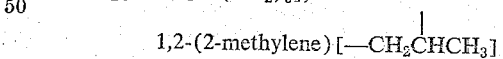

1,4-butylene [—$(CH_2)_4$—], 1,5-pentylene [—$(CH_2)_5$—], 1,6-hexylene [—$(CH_2)_6$—], 1,7-heptylene [—$(CH_2)_7$—], 1,8-octylene [—$(CH_2)_8$—], and the like.

The compounds of Formula I where $R_3$ is amidoximino-lower-alkyl are prepared from the compounds where $R_3$ is the corresponding cyano-lower-alkyl group by reacting the latter with hydroxylamine in the presence of a basic catalyst, for example, sodium carbonate, in an organic solvent inert under the conditions of the reaction, for example, methanol, ethanol, isopropanol, and the like, at a temperature in the range from 50 to 100° C. A preferred solvent is ethanol.

The compounds of Formula I where $R_3$ is amidino are prepared by reacting the compounds of Formula II having the formula

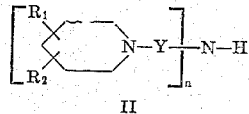

II and where $R_1$, $R_2$, Y, and $n$ have the meanings given about with a 2-lower-alkyl-2-thio-pseudourea. The reaction is carried out at a temperature in the range from 20 to 100° C., and in an organic solvent inert under the conditions of the reaction, for example, methanol, ethanol, isopropanol, acetone, and the like.

The compounds of Formula I where $R_3$ is cyano-lower-alkyl, and which are required as intermediates for the preparation of the compounds where $R_3$ is amidoximino-lower-alkyl, are prepared by reacting the compounds of Formula II with a cyano-lower-alkyl halide in the presence of an acid-acceptor and at temperatures in the range from 50 to 150° C. The reaction is preferably carried out in an organic solvent inert under the conditions of the reaction, for example, methanol, ethanol, benzene, toluene, and the like. The purpose of the acid-acceptor is to take up the hydrogen halide which is split out during the course of the reaction and can be any basic substance which forms water-soluble salts easily separable from the reaction mixture. Suitable acid-acceptors are alkali metal hydroxides, for example, sodium or potassium hydroxide, alkali metal carbonates or bicarbonates, for example, sodium or potassium carbonate or sodium or potassium bicarbonate, and the like.

Alternatively the compounds of Formula I where $R_3$ is 2-cyanoethyl can be prepared by reacting the compounds of Formula II with acrylonitrile. The reaction is carried out in an organic solvent inert under the conditions of the reaction, for example, benzene, toluene, methanol, acetone, and the like. It is preferred to conduct the reaction in an excess of the acrylonitrile at the boiling point thereof.

The mono- and bis-[(1-piperidyl)-lower-alkyl]amines of Formula II which are required as intermediates for the preparation of the compounds of Formula I are prepared by reducing, with hydrogen in the presence of a catalyst, a 1-(cyano-lower-alkyl)piperidine having the formula

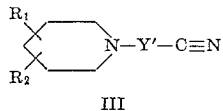

III where $R_1$ and $R_2$ have the meanings given above; and Y' is lower-alkylene containing from one to seven carbon atoms and interposing at least one carbon atom between the ring nitrogen atom of the piperidine nucleus and the cyano group.

The reduction of the compounds of Formula III is carried out in an organic solvent inert under the conditions of the reaction, for example, methanol, ethanol, or isopropanol, at a temperature in the range from about 20° C. to about 70° C. and at hydrogen pressures in the range from about 40 pounds p.s.i. to about 1,000 pounds p.s.i. When the reduction is carried out in a neutral medium, the bis-[(1-piperidyl)-lower-alkyl]amines of Formula II ($n$ is 2) are the predominant products although the mono-[(1-piperidyl)-lower-alkyl]amines ($n$ is 1) are also produced. On the other hand, if the solvent used is first saturated with anhydrous ammonia, so that the reaction medium is strongly ammoniacal, the predominant products are the mono-[(1-piperidyl)-lower-alkyl]-amines, although the bis-[(1-piperidyl)-lower-alkyl]-amines are also produced in minor amounts. Suitable catalysts are platinum oxide, palladium-on-charcoal, and rhodium-on-alumina. A preferred catalyst is rhodium-on-alumina.

The 1-(cyano-lower-alkyl)piperidines of Formula III are disclosed in and are prepared by methods described in our U.S. Patent 3,262,936 (patented July 26, 1966). These methods comprise, for example reacting an acrylonitrile with a piperidine in the presence of a basic catalyst, a method used for the preparation of the compounds where Y' is lower-alkylene interposing two carbon atoms between the cyano group and the ring nitrogen atom of the piperidine nucleus. The reaction is represented by the equation:

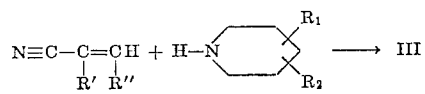

where $R_1$ and $R_2$ have the meanings given above and each of R' and R" stands for hydrogen or the methyl radical, or one of R' and R" is hydrogen while the other is the ethyl radical. The reaction is preferably carried out in a solvent inert under the conditions of the reaction, for example, water, benzene, dioxane, pyridine, or acetonitrile. A preferred solvent is water. Suitable basic catalysts are tri-lower-alkylamines, for example, triethylamine, or basic tertiary heterocyclic amines, for example, pyridine, or quaternary ammonium hydroxides, for example, Triton B® (benzyl trimethylammonium hydroxide). A preferred basic catalyst is triethylamine.

The compounds of Formula III where Y' is lower-alkylene interposing from one to seven carbon atoms between the cyano group and the ring nitrogen atom of the piperidine nucleus are prepared by reacting a cyano-lower-alkyl halide with an appropriate substituted-piperidine in the presence of an acid-acceptor. The reaction is preferably carried out in an organic solvent inert under the conditions of the reaction, for example, tetrahydrofuran, acetone, methanol, ethanol, isopropanol, and the like. The purpose of the acid-acceptor is to take up the hydrogen halide split out during the course of the reaction and is a basic substance which forms water-soluble by-products easily separable from the main product of the reaction and includes such substances as alkali metal salts of weak acids, e.g. sodium carbonate, sodium bicarbonate, potassium carbonate, sodium acetate, and the like. The acid-acceptor can also be in the form of an excess quantity of the substituted-piperidine.

The novel compounds of the instant invention are the compounds of Formula I and their acid-addition salts. The compounds of Formula I, in free base form, are converted to the acid-addition salt form by interaction of the base with an acid. In like manner, the free bases can be regenerated from the acid-addition salt form in the conventional manner, that is, by treating the salts with strong aqueous bases, for example, alkali metal hydroxides, alkali metal carbonates, and alkali metal bicarbonates. The bases thus regenerated can then be interacted with the same or a different acid to give back the same or a different acid-addition salt. Thus the novel bases and all their acid-addition salts are readily interconvertible.

It will thus be appreciated that Formula I not only represents the structural configuration of the bases of the invention but is also representative of the structural entity which is common to all of our compounds of Formula I, whether in the form of the free bases or in the form of the acid-addition salts of the bases. We have found that by virtue of this common structural entity, the bases and their acid-addition salts have inherent pharmacodynamic and chemotherapeutic activity of a type to be more fully described hereinbelow. This inherent pharmacodynamic and chemotherapeutic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically acceptable salts. Although water-insolubility, high toxicity, or lack of crystalline character may make some particular salt species unsuitable or less desirable for use as such in a given pharmaceutical application, the waterinsoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of our new bases are useful and valuable compounds, regardless of considerations of solubility, toxicity, physical form, and the like, and are accordingly within the purview of the instant invention.

The novel feature of the compounds of the invention then, resides in the concept of the bases and cationic forms of the new N-(amidoximino-lower-alkyl)- and N-amidino-[(1-piperidyl)-lower alkyl]amines and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids; such as found, for example, in Beilstein's Organische Chemie, 4th ed., volumes III, IV, IX, X, XIV, XVII, XIX, XXI, XXII, and XXV; organic mono- and poly-sulfonic and -sulfinic acids; such as found, for example, in Beilstein volumes VI, XI, XVI, and XXII; organic phosphonic and phosphinic acids; such as found, for example, in Beilstein volumes XI and XVI; organic acids of arsenic and antimony; such as found, for example, in Beilstein volume XVI; organic heterocyclic carboxylic, sulfonic, and sulfinic acids such as found, for example, in Beilstein volumes XVIII, XXII, and XXV; acidic ion-exchange resins; and inorganic acids of any acid-forming element or combination of elements, such as found in Mellor, Comprehensive Treatise on Inorganic and Theoretical Chemistry, Longman's, Green and Co., New York, N.Y. volumes I–XVI. In addition, other salt-forming compounds which are acidic in their chemical properties, but which are not generally considered as acids in the same sense as carboxylic or sulfonic acids, are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example, boron trifluoride.

Thus appropriate acid-addition salts are those derived from such diverse acids as formic acid, acetic acid, isobutyric acid, alpha-mercaptopropionic acid, malic acid, fumaric acid, succinic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I have shown that they possess pharmacodynamic and chemotherapeutic properties, in particular, anti-inflammatory, hypotensive, anti-fungal, and anthelmintic activities thus indicating their usefulness as anti-inflammatory, anti-fungal, anthelmintic, and blood pressure lowering agents.

The structures of the compounds of the invention are established by their mode of synthesis and corroborated by the correspondence between calculated values for the elements and values found by chemical analysis.

The following examples will further illustrate the invention without the latter being limited thereto.

EXAMPLE 1

3 - (4 - carbamyl-1-piperidyl)propylamine [II: $R_1$ is 4-$CONH_2$; $R_2$ is H; Y is $(CH_2)_3$; $n$ is 1]

To a solution of 34.75 g. (0.19 mole) of 1-(2-cyanoethyl)-4-carbamylpiperidine in 450 ml. of ethanol saturated with anhydrous ammonia was added 4.2 g. of a 5% rhodium-on-alumina catalyst. The mixture was reduced with hydrogen under an initial pressure of 210 pounds p.s.i. at a temperature of 25° C. Reduction was complete in three hours. The catalyst was removed by filtration, washed with ethanol, the filtrate concentrated to dryness in vacuo and the white crystalline residue extracted with acetone, filtered, and the filtrate taken to dryness yielding 25.4 g. of a white powder which was recrystallized twice from a benzene-hexane mixture giving 22.0 g. of 3-(4-carbamyl-1-piperidyl)propylamine, M.P. 85–88° C. (uncorr.).

EXAMPLE 2

N,N-bis-[6-(4-cyclohexylmethyl-1-piperidyl)hexyl]amine [II: $R_1$ is 4-$C_6H_{11}CH_2$; $R_2$ is H; Y is $(CH_2)_6$; $n$ is 2]

(a) 1 - (5 - cyanopentyl)-4-cyclohexylmethylpiperidine (55.3 g., 0.2 mole) was dissolved in 250 ml. of ethanol and reduced over 4.5 g. of a rhodium-on-alumina catalyst under 60 pounds p.s.i. of hydrogen. When reduction was completed, the catalyst was removed by filtration and the residue distilled in vacuo, all material (22.7 g.) boiling at 117–128° C./0.046–0.055 mm. being collected as 6 - (4-cyclohexylmethyl-1-piperidyl)hexylamine. A small amount of the latter in isopropanol was converted to the dihydrochloride salt and recrystallized twice from ethanol-acetone to give 6-(4-cyclohexylmethyl-1-piperidyl)hexylamine dihydrochloride, M.P. 231.6–236.2° C.

Analysis.—Calcd. for $C_{18}H_{36}N_2 \cdot 2HCl$: C, 61.17; H, 10.84; Cl, 20.07. Found: C, 61.20; H, 10.71; Cl, 19.63.

(b) The pot residue remaining after distillation of the primary amine was recrystallized several times from acetone-ethanol to give 26.6 g. of N,N-bis-[6-(4-cyclohexylmethyl-1-piperidyl)hexyl]amine, M.P. 53.5–54.5° C.

*Analysis.*—Calcd. for $C_{36}H_{69}N_3$: C, 79.49; H, 12.79; N, 7.72. Found: C, 79.33; H, 12.73; N, 7.59.

EXAMPLES 3–17

The following mono-[(1-piperidyl)-lower-alkyl]amines of Formula II [$n$ is 1; $R_2$ is H] listed below in Table 1 are prepared according to one of the procedures described above in Examples 1 or 2 by reduction of an appropriate 1-($\omega$-cyano-lower-alkyl)piperidine of Formula III with hydrogen over a rhodium-on-alumina catalyst. All melting points are corrected.

TABLE 1

| Ex. | $R_1$ | Y | Base or Salt | M.P. (° C.) | Cryst. from— |
|---|---|---|---|---|---|
| 3 | 4-CONHCH$_3$ | (CH$_2$)$_3$ | 2HCl | 239.6–240.6 | Ethanol/ether. |
| 4 | 4-CONHC$_2$H$_5$ | (CH$_2$)$_3$ | 2HCl | 245.0–246.2 | Do. |
| 5 | 4-CON(CH$_3$)$_2$ | (CH$_2$)$_3$ | Base | (1) | |
| 6 | 4-CON(C$_2$H$_5$)$_2$ | (CH$_2$)$_3$ | do | (2) | |
| 7 | 4-CH$_2$C$_6$H$_5$ | (CH$_2$)$_3$ | 2HCl | 191.6–193.4 | Do. |
| 8 | 4-CH$_2$C$_6$H$_{11}$ | (CH$_2$)$_3$ | 2HCl | 280.2–282.4 | Do. |
| 9 | 4-HO | (CH$_2$)$_3$ | Base | (3) | |
| 10 | 4-HO(CH$_2$)$_3$ | (CH$_2$)$_3$ | do | 163.8–165.2 | Isopropanol. |
| 11 | 4-(CH$_3$)$_2$CH | (CH$_2$)$_3$ | 2HCl | 215.2–217.8 | Do. |
| 12 | 3-CH$_3$CONH | (CH$_2$)$_3$ | Base | (4) | |
| 13 | 4-CH$_2$C$_6$H$_{11}$ | (CH$_2$)$_2$ | 2HCl | 259.8–262.8 | Ethanol/acetone. |
| 14 | 2-CH$_2$C$_6$H$_{11}$ | (CH$_2$)$_3$ | 2HCl | 200.0–206.8 | Isopropanol. |
| 15 | 4-CH$_2$C$_6$H$_{11}$ | (CH$_2$)$_4$ | 2HCl | 262.8–266.0 | Do. |
| 16 | 4-CH$_2$C$_6$H$_{11}$ | (CH$_2$)$_5$ | 2HCl | 250.6–257.2 | Do. |
| 17 | 4-CH$_2$C$_6$H$_{11}$ | (CH$_2$)$_7$ | 2HCl | 247.0–249.6 | Acetone. |

[1] B.P. 123–124° C./0.09 mm.; $n_D^{25}=1.5042$.
[2] B.P. 131–138° C./0.109–0.113 mm.; $n_D^{25}=1.4938$.
[3] B.P. 85.3–86.8° C./0.033 mm.; $n_D^{25}=1.5050$.
[4] B.P. 147–157° C./0.045–0.095 mm.; $n_D^{25}=1.5070$.

EXAMPLES 18–33

The following N,N-bis-[(1-piperidyl)-lower-alkyl]amines of Formula II [$n$ is 2; $R_2$ is H] listed below in Table 2 are prepared according to one of the procedures described above in Examples 1 or 2 by reduction of an appropriate 1-($\omega$-cyano-lower-alkyl)piperidine of Formula III with hydrogen over a rhodium-on-alumina catalyst. All melting points are corrected.

TABLE 2

| Ex. | $R_1$ | Y | Base or Salt | M.P. (° C.) | Cryst. from— |
|---|---|---|---|---|---|
| 18 | 4-CONHCH$_3$ | (CH$_2$)$_3$ | Base | 303.0–203.8 | Ethanol/acetone. |
| 19 | 4-CONHC$_2$H$_5$ | (CH$_2$)$_3$ | do | 191.2–192.8 | |
| 20 | 4-CON(CH$_3$)$_2$ | (CH$_2$)$_3$ | do | 87.8–88.6 | Hexane. |
| 21 | 4-CH$_2$C$_6$H$_5$ | (CH$_2$)$_3$ | 3HCl | 266.6–263.0 | Ether. |
| 22 | 4-CH$_2$C$_6$H$_{11}$ | (CH$_2$)$_3$ | 3HCl | >300 | Isopropanol/ether. |
| 23 | 4-(CH$_3$)$_2$CH | (CH$_2$)$_3$ | Base | (1) | |
| 24 | 4-HO | (CH$_2$)$_3$ | do | (2) | |
| 25 | 4-HO(CH$_2$)$_3$ | (CH$_2$)$_3$ | 3HCl | 191.2–199.4 | Isopropanol. |
| 26 | 4-CH$_2$C$_6$H$_{11}$ | (CH$_2$)$_2$ | 3HCl | 294.4–298.2 | Ethanol. |
| 27 | 4-CH$_2$C$_6$H$_{11}$ | (CH$_2$)$_3$ | Base | 37.2–43.0 | Acetone. |
| 28 | 2-CH$_2$C$_6$H$_{11}$ | (CH$_2$)$_3$ | 3HCl | 179.2–192.4 | Do. |
| 29 | 4-CH$_2$C$_6$H$_{11}$ | (CH$_2$)$_4$ | Base | 50.2–51.0 | Hexane. |
| 30 | 4-CH$_2$C$_6$H$_{11}$ | (CH$_2$)$_5$ | do | 57.2–58.5 | Acetone. |
| 31 | 4-CH$_2$C$_6$H$_{11}$ | (CH$_2$)$_7$ | do | 63.6–64.4 | Do. |
| 32 | 4-C$_6$H$_5$ṆCOCH$_3$ | (CH$_2$)$_3$ | 3HCl | 247.8–251.0 | Methanol/acetone. |
| 33 | 4-C$_6$H$_5$ṆCH$_3$ | (CH$_2$)$_3$ | 3H$_2$O | 88–100 | Acetone/water. |

[1] B.P. 125.5–131.0° C./0.0015 mm.; $n_D^{25}=1.4832$. Trihydrochloride, recrystallized from isopropanol, gave M.P. 291.2–293.4° C. (corr.).
[2] B.P. 186–193° C./0.002–0.0024 mm.; $n_D^{25}=1.5197$.

EXAMPLES 34–73

By following the manipulative procedure described above in Example 1, substituting for the 1-(2-cyanoethyl)-4-carbamylpiperidine used therein, a molar equivalent amount of an appropriate 1-(cyano-lower-alkyl)-substituted-piperidine, there can be obtained the (substituted-1-piperidyl)-lower-alkylamine of Formula II ($n$ is 1) listed below in Table 3.

TABLE 3

| Example | Y | $R_1$ | $R_2$ |
|---|---|---|---|
| 34 | (CH$_2$)$_3$ | 4-CH$_2$OH | H |
| 35 | (CH$_2$)$_3$ | 4-CH$_2$CH$_2$OH | H |
| 36 | (CH$_2$)$_2$ | 4-HO | (1) |
| 37 | (CH$_2$)$_5$ | 4-HO | (2) |
| 38 | (CH$_2$)$_3$ | 4-HO | (3) |
| 39 | (CH$_2$)$_3$ | 4-(CH$_2$)$_6$OH | H |
| 40 | (CH$_2$)$_3$ | 4-NHCHO | H |
| 41 | (CH$_2$)$_3$ | 4-NHCOCH(C$_2$H$_5$)CH$_2$CH$_3$ | H |
| 42 | (CH$_2$)$_3$ | 3-CONHCH$_2$CH$_2$CH$_2$CH$_3$ | H |
| 43 | (CH$_2$)$_3$ | 4-CONC$_5$H$_{10}$ | H |
| 44 | (CH$_2$)$_3$ | 4-CONC$_4$H$_8$ | H |
| 45 | (CH$_2$)$_3$ | 4-C$_6$H$_5$O | H |
| 46 | (CH$_2$)$_3$ | 4-(2-naphthyl—O—) | H |
| 47 | (CH$_2$)$_3$ | 4-C$_6$H$_5$CH$_2$CH$_2$O | H |
| 48 | (CH$_2$)$_3$ | 4-(2-naphthyl—CH$_2$CH$_2$—O) | H |
| 49 | (CH$_2$)$_3$ | 3-CH$_3$O | H |
| 50 | (CH$_2$)$_4$ | 4-C$_2$H$_5$O(CH$_2$)$_3$ | H |
| 51 | (CH$_2$)$_2$ | 3-(4-ClC$_6$H$_4$OCH$_2$CH$_2$) | H |
| 52 | (CH$_2$)$_5$ | 4-[(2-naphthyl)—O—(CH$_2$)$_2$] | H |
| 53 | (CH$_2$)$_3$ | 4-C$_6$H$_5$ṆCH$_3$ | H |
| 54 | (CH$_2$)$_3$ | 4-C$_6$H$_5$ṆCOCH$_3$ | H |
| 55 | (CH$_2$)$_3$ | 4-C$_6$H$_5$ṆCH$_2$CH$_2$C$_6$H$_5$ | H |
| 56 | (CH$_2$)$_4$ | 4-C$_6$H$_5$ṆCOC$_6$H$_5$ | H |
| 57 | (CH$_2$)$_2$ | 2-naphthyl—ṆCH$_3$ | H |
| 58 | (CH$_2$)$_3$ | 4-(4-C$_5$H$_4$N)ṆCH$_3$ | H |
| 59 | (CH$_2$)$_3$ | 4-(1-methyl-3-piperidyl)ṆCH$_3$ | H |
| 60 | (CH$_2$)$_3$ | 4-(1-acetyl-3-piperidyl)ṆCH$_3$ | H |
| 61 | (CH$_2$)$_3$ | 4-(1-phenethyl-3-piperidyl)ṆCH$_3$ | H |
| 62 | (CH$_2$)$_3$ | 4-(1-benzoyl-3-piperidyl)ṆCH$_3$ | H |
| 63 | (CH$_2$)$_3$ | 4-C$_6$H$_5$ṆCONH$_2$ | H |
| 64 | (CH$_2$)$_3$ | 4-C$_6$H$_5$ṆCONHCH$_3$ | H |
| 65 | (CH$_2$)$_3$ | 4-C$_6$H$_5$ṆCON(CH$_3$)$_2$ | H |
| 66 | (CH$_2$)$_3$ | 4-(2-isoindolinyl) | H |
| 67 | (CH$_2$)$_3$ | 4-(1-pyrrolidyl) | H |
| 68 | (CH$_2$)$_3$ | 4-(1-piperidyl) | H |
| 69 | (CH$_2$)$_3$ | 4-(4-methyl-1-piperazinyl) | H |
| 70 | (CH$_2$)$_3$ | 4-(4-acetyl-1-piperazinyl) | H |
| 71 | (CH$_2$)$_3$ | 4-(4-phenyl-1-piperazinyl) | H |
| 72 | (CH$_2$)$_3$ | 4-(4-phenethyl-1-piperazinyl) | H |
| 73 | (CH$_2$)$_3$ | 4-(4-benzoyl-1-piperazinyl) | H |

[1] 2,6-(CH$_3$)$_2$
[2] 2,2,4,6,6-(CH$_3$)$_5$
[3] 2,2-(CH$_3$)$_2$-6-(CH$_3$)$_2$CHCH$_2$

EXAMPLES 74–111

By following the manipulative procedure described above in Example 2, substituting for the 1-(5-cyanopentyl)-4-cyclohexylmethylpiperidine used therein, a molar equivalent amount of an appropriate 1-(cyano-lower-alkyl)-substituted-piperidine, there can be obtained the N,N-bis-[(substituted-1-piperidyl)-lower-alkyl]amines of Formula II ($n$ is 2) listed below in Table 4.

TABLE 4

| Example | Y | $R_1$ | $R_2$ |
|---|---|---|---|
| 74 | (CH$_2$)$_3$ | 4-CH$_2$OH | H |
| 75 | (CH$_2$)$_3$ | 4-CH$_2$CH$_2$OH | H |
| 76 | (CH$_2$)$_2$ | 4-HO | (1) |
| 77 | (CH$_2$)$_5$ | 4-HO | (2) |
| 78 | (CH$_2$)$_3$ | 4-HO | (3) |
| 79 | (CH$_2$)$_3$ | 4-(CH$_2$)$_6$OH | H |
| 80 | (CH$_2$)$_3$ | 4-NHCHO | H |
| 81 | (CH$_2$)$_3$ | 4-NHCOCH(C$_2$H$_5$)CH$_2$CH$_3$ | H |
| 82 | (CH$_2$)$_3$ | 3-CONHCH$_2$CH$_2$CH$_2$CH$_3$ | H |
| 83 | (CH$_2$)$_3$ | 4-CONC$_5$H$_{10}$ | H |
| 84 | (CH$_2$)$_3$ | 4-CONC$_4$H$_8$ | H |
| 85 | (CH$_2$)$_3$ | 4-C$_6$H$_5$O | H |
| 86 | (CH$_2$)$_3$ | 4-(2-naphthyl—O) | H |
| 87 | (CH$_2$)$_3$ | 4-C$_6$H$_5$CH$_2$CH$_2$O | H |
| 88 | (CH$_2$)$_3$ | 4-(2-naphthyl—CH$_2$CH$_2$—O) | H |
| 89 | (CH$_2$)$_3$ | 3-CH$_3$O | H |
| 90 | (CH$_2$)$_4$ | 4-C$_2$H$_5$O(CH$_2$)$_3$ | H |
| 91 | (CH$_2$)$_2$ | 3-(4-ClC$_6$H$_5$OCH$_2$CH$_2$) | H |
| 92 | (CH$_2$)$_5$ | 4-[(2-naphthyl)—O—(CH$_2$)$_2$] | H |
| 93 | (CH$_2$)$_3$ | 4-C$_6$H$_5$ṆCH$_2$CH$_2$C$_6$H$_5$ | H |
| 94 | (CH$_2$)$_4$ | 4-C$_6$H$_5$ṆCOC$_6$H$_5$ | H |
| 95 | (CH$_2$)$_2$ | 2-naphthyl—ṆCH$_3$ | H |
| 96 | (CH$_2$)$_2$ | 4-(4-C$_5$H$_4$N)ṆCH$_3$ | H |
| 97 | (CH$_2$)$_3$ | 4-(1-methyl-3-piperidyl)ṆCH$_3$ | H |
| 98 | (CH$_2$)$_3$ | 4-(1-acetyl-3-piperidyl)ṆCH$_3$ | H |
| 99 | (CH$_2$)$_3$ | 4-(1-phenethyl-3-piperidyl)ṆCH$_3$ | H |
| 100 | (CH$_2$)$_3$ | 4-(1-benzoyl-3-piperidyl)ṆCH$_3$ | H |

TABLE 4—Continued

| Example | Y | R₁ | R₂ |
|---|---|---|---|
| 101 | (CH₂)₃ | 4-C₆H₅ṄCONH₂ | H |
| 102 | (CH₂)₃ | 4-C₆H₅ṄCONHCH₃ | H |
| 103 | (CH₂)₃ | 4-C₆H₅ṄCON(CH₃)₂ | H |
| 104 | (CH₂)₃ | 4-(2-isoindolinyl) | H |
| 105 | (CH₂)₃ | 4-(1-pyrrolidyl) | H |
| 106 | (CH₂)₃ | 4-(1-piperidyl) | H |
| 107 | (CH₂)₃ | 4-(4-methyl-1-piperazinyl) | H |
| 108 | (CH₂)₃ | 4-(4-acetyl-1-piperazinyl) | H |
| 109 | (CH₂)₃ | 4-(4-phenyl-1-piperazinyl) | H |
| 110 | (CH₂)₃ | 4-(4-phenethyl-1-piperazinyl) | H |
| 111 | (CH₂)₃ | 4-(4-benzoyl-1-piperazinyl) | H |

¹ 2,6-(CH₃)₂
² 2,2,4,6,6-(CH₃)₅
³ 2,2-(CH₃)₂-6-(CH₃)₂CHCH₂

EXAMPLE 112

3-(4-cyclohexylmethyl-1-piperidyl)propylguanidine hydrobromide [I: R₁ is 4-CH₂C₆H₁₁; R₂ is H; R₃ is C(=NH)NH₂; Y is (CH₂)₃; n is 1].

A mixture of 4.76 g. (0.02 mole) of 3-(4-cyclohexylmethyl-1-piperidyl)propylamine and 3.6 g. (0.02 mole) of 2-methyl-2-thiopseudourea hydrobromide, in about 15 ml. of absolute ethanol, was heated under reflux for about five hours and taken to dryness giving 6.3 g. of a pale yellow gum. The latter was recrystallized several times from acetone giving 3.5 g. of 3-(4-cyclohexylmethyl-1-piperidyl)-propylguanidine hydrobromide, M.P. 112.0–113.0° C. (corr.).

EXAMPLES 113–157

By following the manipulative procedure described above in Example 112, substituting for the 3-(4-cyclohexylmethyl-1-piperidyl)propylamine used therein a molar equivalent amount of an appropriate [(substituted-1-piperidyl)-lower-alkyl]amine of Formula I listed in Table 5 below where in each case n is 1.

TABLE 5

| Example | R₁ | R₂ | Y |
|---|---|---|---|
| 113 | 4-CONH₂ | H | (CH₂)₃ |
| 114 | 4-CONHC₂H₅ | H | (CH₂)₃ |
| 115 | 4-CON(CH₃)₂ | H | (CH₂)₃ |
| 116 | 4-CH₂C₆H₅ | H | (CH₂)₃ |
| 117 | 4(-CH₃)₂CH | H | (CH₂)₃ |
| 118 | 4-CH₂OH | H | (CH₂)₃ |
| 119 | 4-CH₂CH₂CH₂OH | H | (CH₂)₃ |
| 120 | 4-HO | (¹) | (CH₂)₂ |
| 121 | 4-HO | (²) | (CH₂)₅ |
| 122 | 4-HO | (³) | (CH₂)₃ |
| 123 | 4-(CH₂)₆OH | H | (CH₂)₃ |
| 124 | 4-NHCHO | H | (CH₂)₃ |
| 125 | 4-NHCOCH(C₂H₅)CH₂CH₃ | H | (CH₂)₃ |
| 126 | 3-CONHCH₂CH₂CH₃ | H | (CH₂)₃ |
| 127 | 4-CONC₅H₁₀ | H | (CH₂)₃ |
| 128 | 4-CONC₄H₈ | H | (CH₂)₃ |
| 129 | 4-C₆H₅O | H | (CH₂)₃ |
| 130 | 4-(2-naphthyl-O−) | H | (CH₂)₃ |
| 131 | 4-C₆H₅CH₂O | H | (CH₂)₃ |
| 132 | 4-(2-naphthyl-CH₂CH₂-O−) | H | (CH₂)₃ |
| 133 | 3-CH₃O | H | (CH₂)₃ |
| 134 | 4-C₂H₅O(CH₂)₃ | H | (CH₂)₂ |
| 135 | 3-(4-ClC₆H₄OCH₂CH₂) | H | (CH₂)₂ |
| 136 | 4-[(2-naphthyl)−O−(CH₂)₂] | H | (CH₂)₅ |
| 137 | 4-C₆H₅ṄCH₃ | H | (CH₂)₃ |

| Example | R₁ | R₂ | Y |
|---|---|---|---|
| 138 | 4-C₆H₅ṄCOCH₃ | H | (CH₂)₃ |
| 139 | 4-C₆H₅ṄCH₂CH₂C₆H₅ | H | (CH₂)₃ |
| 140 | 4-C₆H₅ṄCOC₆H₅ | H | (CH₂)₄ |
| 141 | 2-naphthyl-ṄCH₃ | H | (CH₂)₄ |
| 142 | 4-(4-C₅H₄N)ṄCH₃ | H | (CH₂)₃ |
| 143 | 4-(1-methyl-3-piperidyl)ṄCH₃ | H | (CH₂)₃ |
| 144 | 4-(1-acetyl-3-piperidyl)ṄCH₃ | H | (CH₂)₃ |
| 145 | 4-(1-phenethyl-3-piperidyl)ṄCH₃ | H | (CH₂)₃ |
| 146 | 4-(1-benzoyl-3-piperidyl)ṄCH₃ | H | (CH₂)₃ |
| 147 | 4-C₆H₅ṄCONH₂ | H | (CH₂)₃ |
| 148 | 4-C₆H₅ṄCONHCH₃ | H | (CH₂)₃ |
| 149 | 4-C₆H₅ṄCON(CH₃)₂ | H | (CH₂)₃ |
| 150 | 4-(2-isoindolinyl) | H | (CH₂)₃ |
| 151 | 4-(1-pyrrolidyl) | H | (CH₂)₃ |
| 152 | 4-(1-piperidyl) | H | (CH₂)₃ |
| 153 | 4-(4-methyl-1-piperazinyl) | H | (CH₂)₃ |
| 154 | 4-(4-acetyl-1-piperazinyl) | H | (CH₂)₃ |
| 155 | 4-(4-phenyl-1-piperazinyl) | H | (CH₂)₃ |
| 156 | 4-(4-phenethyl-1-piperazinyl) | H | (CH₂)₃ |
| 157 | 4-(4-benzoyl-1-piperazinyl) | H | (CH₂)₃ |

¹ 2,6-(CH₃)₂.
² 2,2,4,6,6-(CH₃)₅.
³ 2,2-(CH₃)₂-6-(CH₃)₂CHCH₂.

EXAMPLE 158

N-(2-cyanoethyl)-N,N-bis-[3-(4-cyclohexylmethyl-1-piperidyl)-propyl]amine [I: R₁ is 4-CH₂C₆H₁₁; R₂ is H; R₃ is CH₂CH₂CN; Y is (CH₂)₃; n is 2]

A mixture of 13.8 g. (0.03 mole) of N,N-bis [3-(4-cyclohexylmethyl-1-piperidyl)propyl]amine and 10 ml. of acrylonitrile was heated under reflux for about seven hours and taken to dryness in vacuo. The latter was recrystallized once from hexane and twice from acetone giving 11.7 g. of N-(2-cyanoethyl)-N,N-bis-[3-(4-cyclohexylmethyl-1-piperidyl)-propyl]amine, M.P. 48.6–50.8° C. (corr.).

EXAMPLE 159

N-(3-cyanopropyl)-N,N-bis-[3-(4-carbamyl-1-piperidyl)propyl]-amine [I: R₁ is 4-COHN₂; R₂ is H; R₃ is CH₂CH₂CH₂CN; Y is (CH₂)₃; n is 2]

Reaction of N,N-bis-[3-(4-carbamyl-1-piperidyl)-propyl]amine with γ-bromopropionitrile in ethanol in the presence of anhydrous sodium carbonate affords N-(3-cyanopropyl)-N,N-bis-[3-(4-carbamyl-1-piperidyl)propyl]amine.

EXAMPLES 160–203

By reacting a halo-lower-alkanonitrile with an appropriate N,N-bis-[(substituted-1-piperidyl)-lower-alkyl]-amine using the manipulative procedure described above in Example 159, there can be obtained the N-cyano-lower-alkyl-N,N-bis-[(substituted-1-piperidyl)-lower-alkyl] amines of Formula I listed below in Table 6, where in each case n is 2.

TABLE 6

| Example | R₁ | R₂ | R₃ | Y |
|---|---|---|---|---|
| 160 | 4-CONHC₂H₅ | H | CH₂CN | (CH₂)₃ |
| 161 | 4-CON(CH₃)₂ | H | (CH₂)₂CN | (CH₂)₃ |
| 162 | 4-CH₂C₆H₅ | H | (CH₂)₂CN | (CH₂)₃ |
| 163 | 4-(CH₃)₂CH | H | (CH₂)₂CN | (CH₂)₃ |
| 164 | 4-HO | H | (CH₂)₃CN | (CH₂)₃ |
| 165 | 4-HO(CH₂)₃ | H | (CH₂)₃CN | (CH₂)₃ |
| 166 | 4-CH₂C₆H₁₁ | H | (CH₂)₃CN | (CH₂)₂ |
| 167 | 4-HO | (¹) | (CH₂)₄CN | (CH₂)₂ |
| 168 | 4-HO | (²) | (CH₂)₄CN | (CH₂)₅ |
| 169 | 4-HO | (³) | (CH₂)₄CN | (CH₂)₃ |
| 170 | 4-NHCHO | H | (CH₂)₄CN | (CH₂)₃ |
| 171 | 4-NHCOCH(C₂H₅)CH₂CH₃ | H | (CH₂)₅CN | (CH₂)₃ |
| 172 | 3-CONHC₄H₉ | H | (CH₂)₅CN | (CH₂)₃ |
| 173 | 4-CONC₅H₁₀ | H | (CH₂)₅CN | (CH₂)₃ |
| 174 | 4-CONC₄H₈ | H | (CH₂)₅CN | (CH₂)₃ |
| 175 | 4-C₆H₅O | H | (CH₂)₆CN | (CH₂)₃ |

TABLE 6—Continued

| Example | $R_1$ | $R_2$ | $R_3$ | Y |
|---|---|---|---|---|
| 176 | 4-(2-naphthyl—O—) | H | $(CH_2)_6CN$ | $(CH_2)_3$ |
| 177 | 4-$C_6H_5CH_2CH_2O$ | H | $(CH_2)_6CN$ | $(CH_2)_3$ |
| 178 | 4-(2-naphthyl—$CH_2CH_2$—O—) | H | $(CH_2)_7CN$ | $(CH_2)_3$ |
| 179 | 3-$CH_3O$ | H | $(CH_2)_7CN$ | $(CH_2)_3$ |
| 180 | 4-$C_2H_5O(CH_2)_3$ | H | $(CH_2)_7CN$ | $(CH_2)_4$ |
| 181 | 3-(4-$ClC_6H_4OCH_2CH_2$) | H | $(CH_2)_8CN$ | $(CH_2)_2$ |
| 182 | 4-[(2-naphthyl)—O—$(CH_2)_2$] | H | $(CH_2)_8CN$ | $(CH_2)_5$ |
| 183 | 4-$C_6H_5\overset{\mid}{N}CH_3$ | H | $(CH_2)_9CN$ | $(CH_2)_3$ |
| 184 | 4-$C_6H_5\overset{\mid}{N}COCH_3$ | H | $(CH_2)_9CN$ | $(CH_2)_3$ |
| 185 | 4-$C_6H_5\overset{\mid}{N}CH_2CH_2C_6H_5$ | H | $(CH_2)_9CN$ | $(CH_2)_3$ |
| 186 | 4-$C_6H_5\overset{\mid}{N}COC_6H_5$ | H | $(CH_2)_9CN$ | $(CH_2)_4$ |
| 187 | 2-naphthyl—$NCH_3$ | H | $(CH_2)_{10}CN$ | $(CH_2)_3$ |
| 188 | 4-(4-$C_5H_4N$)$NCH_3$ | H | $(CH_2)_3CN$ | $(CH_2)_3$ |
| 189 | 4-(1-methyl-3-piperidyl)$NCH_3$ | H | $(CH_2)_2CN$ | $(CH_2)_3$ |
| 190 | 4-(1-acetyl-3-piperidyl)$NCH_3$ | H | $(CH_2)_2CN$ | $(CH_2)_3$ |
| 191 | 4-(1-phenethyl-3-piperidyl)$NCH_3$ | H | $(CH_2)_2CN$ | $(CH_2)_3$ |
| 192 | 4-(1-benzoyl-3-piperidyl)$NCH_3$ | H | $(CH_2)_2CN$ | $(CH_2)_3$ |
| 193 | 4-$C_6H_5\overset{\mid}{N}CONH_2$ | H | $(CH_2)_2CN$ | $(CH_2)_3$ |
| 194 | 4-$C_6H_5\overset{\mid}{N}CONHCH_3$ | H | $(CH_2)_2CN$ | $(CH_2)_3$ |
| 195 | 4-$C_6H_5\overset{\mid}{N}CON(CH_3)_2$ | H | $(CH_2)_2CN$ | $(CH_2)_3$ |
| 196 | 4-(2-isoindolinyl) | H | $(CH_2)_2CN$ | $(CH_2)_3$ |
| 197 | 4-(1-pyrrolidyl) | H | $(CH_2)_2CN$ | $(CH_2)_3$ |
| 198 | 4-(1-piperidyl) | H | $(CH_2)_2CN$ | $(CH_2)_3$ |
| 199 | 4-(4-methyl-1-piperazinyl) | H | $(CH_2)_2CN$ | $(CH_2)_3$ |
| 200 | 4-(4-acetyl-1-piperazinyl) | H | $(CH_2)_2CN$ | $(CH_2)_3$ |
| 201 | 4-(4-phenyl-1-piperazinyl) | H | $(CH_2)_2CN$ | $(CH_2)_3$ |
| 202 | 4-(4-phenethyl-1-piperazinyl) | H | $(CH_2)_2CN$ | $(CH_2)_3$ |
| 203 | 4-(4-benzoyl-1-piperazinyl) | H | $(CH_2)_2CN$ | $(CH_2)_3$ |

[1] 2,6-$(CH_3)_2$
[2] 2,2,4,6,6-$(CH_3)_5$
[3] 2,2-$(CH_3)_2$-6-$(CH_3)_2CHCH_2$

EXAMPLE 204

β - {N,N - bis - [3-(4-*cyclohexylmethyl*-1-*piperidyl*)*propyl*]*amino*}-*propionamidoxime* [I: $R_1$ is 4-$CH_2C_6H_{11}$; $R_2$ is H; $R_3$ is $CH_2CH_2C(=NOH)NH_2$; Y is $(CH_2)_3$; n is 2]

A mixture of 7.7 g. (0.015 mole) of N-(2-cyanoethyl)-N,N - bis - [3 - (4-cyclohexylmethyl-1-piperidyl)propyl] amine, (2.11 g., 0.03 mole) of hydroxylamine hydrochloride, and 6.36 g. (0.06 mole) of anhydrous sodium carbonate in 250 ml. of ethanol was heated under reflux with stirring overnight. The mixture was filtered, the filtrate taken to dryness, and the residual oil, which crystallized after standing for several days, was recrystallized from acetone giving 3.1 g. of β-{N,N-bis-[3-(4-cyclohexylmethyl - 1 - piperidyl)propyl]amino}-propionamidoxime, M.P. 81.4–85.0° C. (corr.).

β-{N,N-bis-[3-(4-cyclohexylmethyl - 1 - piperidyl)propyl]-amino}propionamidoxime reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

β-{N,N-bis-[3-(4-cyclohexylmethyl - 1 - piperidyl)propyl]amino}propionamidoxime can be reacted with hydriodic acid to form β-{N,N-bis-[3-(4-cyclohexylmethyl - 1 piperidyl)propyl] - amino}propionamidoxime hydriodide, useful as a characterising intermediate.

β-{N,N-bis-[3-(4-cyclohexylmethyl - 1 - piperidyl)propyl]-amino}propionamidoxime, in the form of its hydriodide salt, can be converted to the hydrochloride salt by passing an aqueous solution of the former over an ion-exchange resin saturated with chloride ions, for example, Rohm & Haas' Amberlite® IRA–400 resin (polystyrene divinylbenzene copolymer containing quaternary ammonum groups).

EXAMPLES 205–248

Reaction of the N-cyano-lower-alkyl-N,N-bis-[(substituted-1-piperidyl)-lower-alkyl]amines described above in Examples 160–203 with hydroxylamine according to the manipulative procedure described above in Example 204 affords the respective amidoximes corresponding to the compounds of Examples 160–203.

Our new (1-piperidyl)-lower-alkylamines have been found to possess anti-inflammatory activity in standard animal test procedures. Thus the MIND of 3-(4-cyclohexylmethyl - 1 - piperidyl)propylguanidine hydrobromide and β-{N,N-bis-[3-(4-cyclohexylmethyl - 1 - piperidyl)propyl]amino}propionamidoxime administered subcutaneously in mice in the para-influenza (Sendai strain) virus-induced lung-inflammation test was found to be 100±8 mg./kg. and 6.25±10 mg./kg., respectively, where MIND is defined as the smallest dose producing 30% inhibition of the inflammation.

The compounds have also been shown to possess hypotensive activity in the renal hypertensive rat. Thus the Average Effective Dose (AED) of β-{N,N-bis-[3-(4-cyclohexylmethyl - 1-piperidyl)propyl]amino}propionamidoxime, on subcutaneous administration in the renal hypertensive rat, was found to be 6 mg./kg.

Anthelmintic activity has also been demonstrated in Swiss mice infected by the tapeworm, *Hymenolepis nana*, and the pinworm, *Aspicularis tetraptera*. Thus β-{N,N-bis-[3-(4-cyclohexylmethyl - 1 - piperidyl)propyl]amino}propionamidoxime, administered orally two times a day for four days cleared all mice in the test group infected with *Hymenolepis nana*, at a daily dose of 50 mg./kg. and cleared all mice in the test group infected with *Aspicularis tetraptera* at a daily dose of 100 mg./kg.

In standard serial dilution tests, β-{N,N - bis - [3-(4-cyclohexylmethyl - 1 - piperidyl)propyl]amino}propionamidoxime was found to be fungistatic at concentrations of 0.01 mg./ml.; 0.1 mg./ml.; and 0.01 mg./ml. against the organisms *T. mentagrophytes*, *As. niger*, and *M. albicans*, respectively.

We claim:
1. A compound of the formula

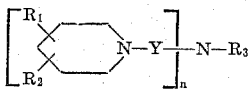

wherein $R_1$ is unsubstituted-carbamyl, N-lower-alkylcarbamyl, N,N-di-lower-alkylcarbamyl, piperidinocarbonyl, pyrrolidinocarbonyl, hydroxy, lower-alkoxy, phenoxy, naphthoxy, phenyl-lower-alkoxy, naphthyl-lower-alkoxy, hydroxy-lower-alkyl, lower-alkoxy-lower-alkyl, phenoxy-lower-alkyl, naphthoxy-lower-alkyl, lower-alkanoylamino, cycloalkyl-lower-alkyl, or the group.

where $R_4$ is phenyl, naphthyl, pyridyl, 3- or 4-piperidyl substituted on the nitrogen atom by lower-alkyl, lower-alkanoyl, phenyl-lower-alkyl, or benzoyl; $R_5$ is lower-alkyl, lower-alkanoyl, phenyl-lower-alkyl, benzoyl, carbamyl, N-lower-alkylcarbamyl, or N,N-di-lower-alkylcarbamyl; or $R_4$ and $R_5$ taken together with the nitrogen atom to which they are attached form a heterocyclic ring selected from the group consisting of isoindolinyl, pyrrolidyl, piperidyl, piperazinyl substituted on the 4-nitrogen atom by lower-alkyl, lower-alkanoyl, phenyl, phenyl-lower-alkyl, or benzoyl; $R_2$ is lower-alkanoyl, phenyl, phenyl-lower-alkyl, or benzoyl; $R_2$ is hydrogen or from one to five lower-alkyls; $R_3$ is amidino or amidoximino-lower-alkyl; Y is lower-alkylene; and $n$ is the integers 1 or 2, the third valence on the amino nitrogen atom being taken up by a hydrogen atom when $n$ is 1.

2. A compound according to claim 1 wherein $R_1$ is cycloalkyl-lower-alkyl; $R_2$ is hydrogen; and $R_3$ is amidoximino-lower-alkyl.

3. A compound according to claim 1 wherein $R_1$ is cycloalkyl-lower-alkyl; $R_2$ is hydrogen; and $R_3$ is amidino.

4. A compound according to claim 1 wherein $R_1$ is N-lower-alkylanilino; $R_2$ is hydrogen; and $R_3$ is amidoximino-lower-alkyl.

5. A compound according to claim 1 wherein $R_1$ is N-lower-alkylanilino; $R_2$ is hydrogen; and $R_3$ is amidino.

6. β-{N,N-bis-[3-(4-cyclohexylmethyl - 1 - piperidyl)propyl]amino}propionamidoxime according to claim 2 wherein $R_1$ is 4-cyclohexylmethyl; $R_3$ is $$CH_2CH_2C(=NOH)NH_2;$$

Y is 1,3-propylene; and $n$ is 2.

7. 3-(4 - cyclohexylmethyl - 1 - piperidyl)propylguanidine according to claim 3 wherein $R_1$ is 4-cyclohexylmethyl; Y is 1,3-propylene; and $n$ is 1.

References Cited

UNITED STATES PATENTS

| 2,928,829 | 3/1960 | Mull | 260—293 |
| 3,252,983 | 5/1966 | Mizzoni | 260—293 |

FOREIGN PATENTS

| 611,886 | 5/1962 | Belgium. |

NORMA S. MILESTONE, *Acting Primary Examiner.*

A. D. SPEVACK, *Assistant Examiner.*

UNITED STATES PATENT OFFICE
CERTIFICATE OF CORRECTION

Patent No. 3,371,094  
February 27, 1968

Bernard L. Zenitz et al.

It is certified that error appears in the above identified patent and that said Letters Patent are hereby corrected as shown below:

Column 1, line 54, "akoxy" should read -- alkoxy --. Column 2, line 10, "or" should read -- on --; line 53, "[-CH$_2$)$_4$-]" should read -- [-(CH$_2$)$_4$-] --; line 54, [-CH$_2$)$_7$-]" should read -- [-(CH$_2$)$_7$-] --. Column 3, line 2, "about" should read -- above --. Column 7, Table 2, fifth column, line 1 thereof "303.0-" should read -- 203.0- --. Column 10, line 43, "R$_1$ is 4-COHN$_2$" should read -- R$_1$ is 4-CONH$_2$ --; Column 12, lines 63 and 64, "ammonum" should read -- ammonium --.

Signed and sealed this 29th day of July 1969.

(SEAL)  
Attest:

Edward M. Fletcher, Jr.  
Attesting Officer

WILLIAM E. SCHUYLER, JR.  
Commissioner of Patents